May 22, 1962 W. WILSON 3,035,804
FLUORESCENT LIGHTING FIXTURE
Original Filed March 17, 1953 8 Sheets-Sheet 1

INVENTOR.
Wesley Wilson.
BY
Bertram Wm Coltman
Atty.

May 22, 1962 W. WILSON 3,035,804
FLUORESCENT LIGHTING FIXTURE
Original Filed March 17, 1953 8 Sheets-Sheet 2

INVENTOR.
Wesley Wilson
BY.
Bertram Wm Coltman

May 22, 1962 W. WILSON 3,035,804
FLUORESCENT LIGHTING FIXTURE
Original Filed March 17, 1953 8 Sheets-Sheet 3

INVENTOR.
Wesley Wilson
BY Bertram Wm. Coltman

May 22, 1962 W. WILSON 3,035,804
FLUORESCENT LIGHTING FIXTURE
Original Filed March 17, 1953 8 Sheets-Sheet 7

INVENTOR.
Wesley Wilson
BY.
Bertram Wm. Coltman
Atty.

United States Patent Office 3,035,804
Patented May 22, 1962

3,035,804
FLUORESCENT LIGHTING FIXTURE
Wesley Wilson, 2017 Winston Drive, Owensboro, Ky.
Original application Mar. 17, 1953, Ser. No. 342,904, now Patent No. 2,907,872, dated Oct. 6, 1959. Divided and this application July 21, 1959, Ser. No. 828,573
21 Claims. (Cl. 248—320)

This invention relates to systems of overhead lighting fixtures or other types of fixtures or instrumentalities which may be advantageously suspended in overhead positions, and more particularly to systems in which the overhead fixtures may be lowered individually for cleaning, lamp replacement or other maintenance.

This application is a division of my application Serial No. 342,904, entitled "Fluorescent Lighting Fixture," filed March 17, 1953, now Patent No. 2,907,872.

The present invention may be applied generally to lighting systems having overhead lighting fixtures mounted at a considerable height. It is difficult and dangerous work to clean and maintain such fixtures where a ladder is employed to reach the fixtures. In systems constructed in accordance with the present invention, such maintenance work will be greatly facilitated, since each fixture in the system may be lowered individually to a point which may easily be reached without using a ladder. In some respects, the present invention may also be regarded as an improvement upon the invention disclosed and claimed in my United States Letters Patent No. 2,391,936, issued January 1, 1946.

One object of the present invention is to provide an overhead fixture system having two flexible tension elements, such as cables or the like, whereby the fixtures of the system may be lowered individually for maintenance or the like. In this connection it is a further object of the invention to provide a lowering device in which swinging of the fixtures being lowered or raised will be minimized and in which the fixtures may be readily kept level, even if one end of each fixture is considerably heavier than the other end.

Another object is to provide a cable-type lowering system in which any one fixture of a series may be employed as a counterweight for any other fixture so that the fixtures may be individually lowered without employing auxiliary counterweights or the like.

It is a further object of the invention to provide an overhead fixture system in which a power-operated winch is employed for paying cable means in and out and thereby raising and lowering individual fixtures of the system. In this connection it is another object to provide a system in which the power-operated winch may be lowered on the cable means for maintenance work or the like. A further object in this regard is to provide a lowering device having a power-operated winch which is so arranged as to afford protection against undue tension or undue slack in the cable means.

Another object is to provide a fixture-lowering system comprising a sectional overhead support movably mounted on an elongated track so that the installation of the support sections may be accomplished at a single point adjacent one end of the track, the sections being moved down the track as the installation work progresses.

It is a further object of the invention to provide a lighting fixture system having fixtures which may be shipped unassembled and which may be assembled at the installation site by purely mechanical operations without installing any electrical wiring in the fixtures themselves.

A further object is to provide a lighting fixture system which incorporates a lowering device and in which necessary overhead wiring may readily be installed, it being unnecessary to install wiring in the individual fixtures at the installation site.

Another object is to provide a lighting fixture system comprising vertically adjustable fixtures which may be provided with one or more ballasts or reactors mounted at one or both ends of each fixture so as to obviate any need for electrical wiring extending between the ends of the fixture.

A further object is to provide a lighting fixture system comprising vertically movable fluorescent-type fixtures arranged so that lamps may be changed only when the fixtures are in lowered position, the fixtures being supplied with electrical power by plug-type connectors which are automatically disconnected when the fixture is lowered, so that there can be no shock hazard in changing the lamps. In this connection it is a further object of the invention to provide fixtures having elements which serve to retain the fluorescent lamps in the fixtures and which are removable only when the fixtures are lowered.

Further objects and advantages of the invention will appear from the following description of an illustrative embodiment, taken with the accompanying drawings, in which.

Figures 1, 2, 3, 4, 5:
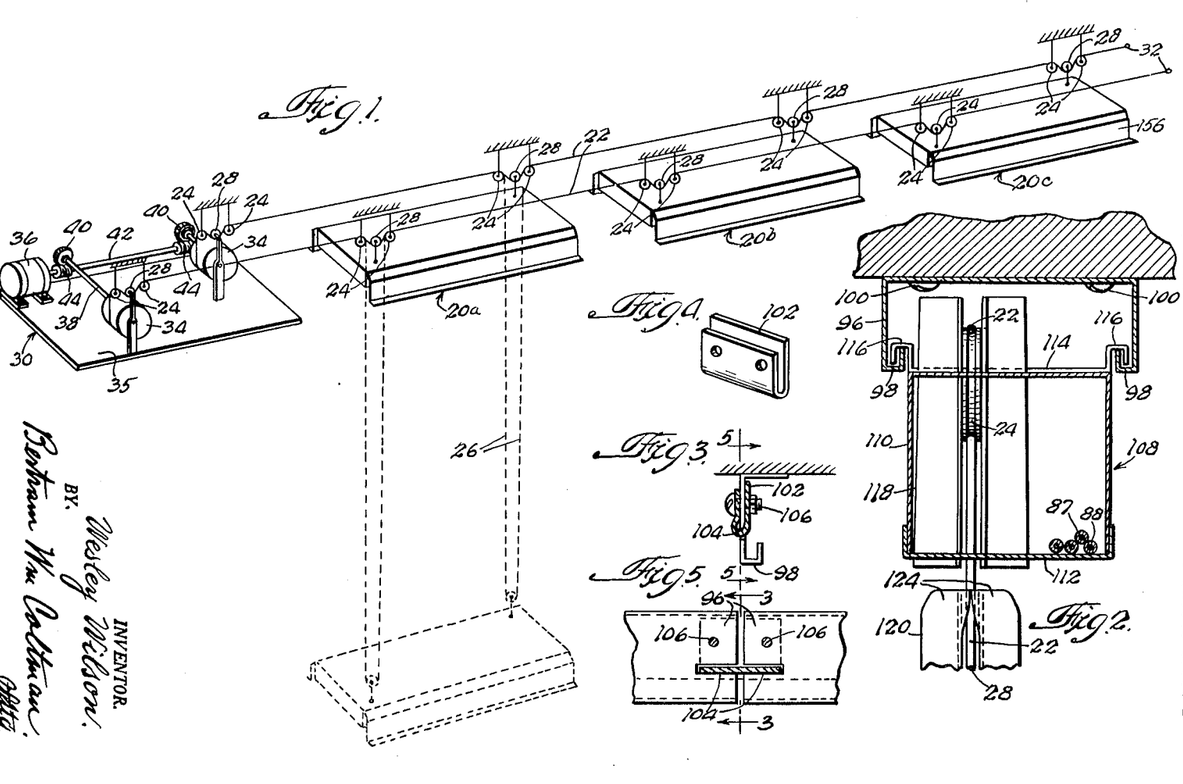
FIGURE 1 is a diagrammatic perspective view of an illustrative lighting fixture system constructed in accordance with the invention.
FIG. 2 is a transverse sectional view of an overhead supporting structure utilized in the fixture system of FIG. 1, taken along a plane indicated by a line 2—2 in FIG. 6, a portion of one of the fixtures being shown in a slightly lowered position.
FIG. 3 is a fragmentary transverse sectional view of a track utilized in the supporting structure of FIG. 2, the view being taken along a plane indicated by a line 3—3 in FIG. 5.
FIG. 4 is a perspective view of a clip employed to connect adjacent sections of the track of FIG. 3.
FIG. 5 is a longitudinal sectional view of a pair of adjacent track sections, taken along a plane indicated by a line 5—5 in FIG. 3.

Considered now in greater detail, FIGURE 1 illustrates an overhead fixture system comprising a plurality of fixtures 20a–20c adapted to be supported in overhead position and to be lowered from this position for maintenance work. While three fixtures are illustrated, any convenient number may be employed in the system. As illustrated, the fixtures are lighting fixtures of the type adapted to receive tubular fluorescent lamps, but it will be understood that, in many respects, the invention is applicable to other types of overhead fixtures and instrumentalities and particularly to other types of lighting fixtures. For example, the invention is applicable to the support of false ceiling panels, light diffusing or reflecting panels, electric fans or other electrical equipment.

Provision is made for raising and lowering the fixtures 20 to and from their normal overhead position. For this purpose, the system is provided with suspension means exemplified as comprising a pair of generally parallel, flexible tension elements in the form of cables 22. Preferably, the cables 22 comprise lengths of "airplane cable" which is made of a large number of strands of very fine alloy steel wire and thus is extremely strong and flexible. To support the cables 22, the fixture system is provided with overhead supporting means comprising a series of overhead guides for each cable 22. In this instance the guides take the form of pulleys 24 mounted on the ceiling or other overhead support. The pulleys 24 are arranged in pairs so that the intermediate portions of each cable 22 extending between the pulleys 24 of the respective pairs may be pulled down to form suspension loops 26 adapted to support the fixtures 20. To engage the suspension loops 26, the fixtures 20 are provided with cable guides in the form of pulleys 28. In the illustrated system, each fixture 20 is provided with two pulleys 28 engaging the respective cables 22, the respective pulleys 28 being mounted at the opposite ends of the fixture 20 so that each end will be supported by one of the cables 22. It will be noted that the spacing of the overhead pulleys 24 is approximately the same as the diameter of the fixture pulleys 28 so that the cable flights which make up the suspension loops 26 will be nearly vertical when the fixtures 20 are lowered, as indicated in dotted lines in FIG. 1.

Provision is made for paying the tension elements 22 in and out so that the fixtures 20 may be raised and lowered. For this purpose, the fixture system of FIG. 1 is provided with a winch 30 adapted to reel and unreel one end of each of the cables 22, the other end of each cable being anchored as indicated at 32. The illustrated winch 30 comprises a pair of reels or winding drums 34, one for each cable 22, mounted on a frame 35. A reversible, selectively operable, electric motor 36 is employed to drive the drums 34 in common. As illustrated, each drum 34 is mounted on a shaft 38 which carries a worm gear 40. The motor 36 has a shaft 42 provided with worms 44 which mesh with the respective worm gears 40.

The illustrated winch 30 is normally disposed in an overhead, out-of-way position, as shown in FIG. 1. However, provision is made for lowering the winch for maintenance. In the illustrated system, the winch 30 is supported on the tension elements 22. For this purpose, two extra pairs of the overhead pulleys 24 are provided for the winch 30. Moreover, an extra set of the fixture pulleys 28 is mounted on the winch 30 itself. The respective tension elements or cables 22 run over the overhead pulleys 24 and are looped under the extra fixture pulleys 28 so that the winch 30, like the fixtures 20, is supported on suspension loops 26. After running over the overhead pulleys 24, the cables 22 extend downwardly, in generally vertical flights 46, to the winding drums 34.

Each of the winding drums 34 has a helical groove 48 (FIG. 15) in its periphery for receiving the successive coils of the cable 22. To prevent the cable 22 from unwinding from the drum 34 in the event that slack should develop in the cable 22, a generally cylindrical shield 50 may be positioned in closely spaced relationship to the periphery of each drum 34. An opening 52 is formed in each of the shields 50 to permit passage of the cable 22.

Provision is made for selectively operating the electric motor 36 in either direction. For this purpose the illustrative winch 30 is provided with a control rocker 54 (FIG. 14) mounted at its mid-point on a pivot 56 and formed at its opposite ends with hooks 58 and 59 adapted to be pulled downwardly with a suitable implement such as a long hooked pole. As will appear in detail shortly, the rocker 54 is adapted to operate a switching mechanism 62 which may be so constructed that pulling the hook 58 downwardly will reel in the cables 22, while pulling the other hook 59 downwardly will unreel the cables 22.

Provision is made for avoiding both excessive and insufficient tension in the cables 22. To this end, the system is provided with tension responsive devices 64 adapted to stop the motor 36 if the tension in the respective cables 22 deviates materially from its normal value. As illustrated, each of the tension responsive devices 64 comprises a generally horizontal, longitudinally movable rod or member 66 carrying a roller 68 engageable with one side of the vertical flight 46 in one of the cables 22. An abutment member 70 is mounted on the rod 66 adjacent the roller to engage the other side of the cable 22 and thereby retain the cable 22 in engagement with the roller 68. The rod 66 may be guided in an apertured supporting member 72 mounted on the winch frame 35. To bias the rod 66 longitudinally in one direction, a compression spring 74 is interposed between supporting member 72 and stop nut 76 threaded onto the rod 66. The spring 74 is adjusted so that the cable flight 46 will normally be deflected somewhat from its vertical run, assuming that normal tension exists in the cable 22. Any increase in the tension in the cable will tend to reduce the deflection in the flight 46 and thus draw the rod 66 in one direction (to the right in FIG. 14) against the biasing action of the spring 74. Conversely, any reduction in the tension in the flight 46 below the normal value will permit movement of the rod 66 in the other direction, under the urging of the spring 74.

Figures 14, 15:
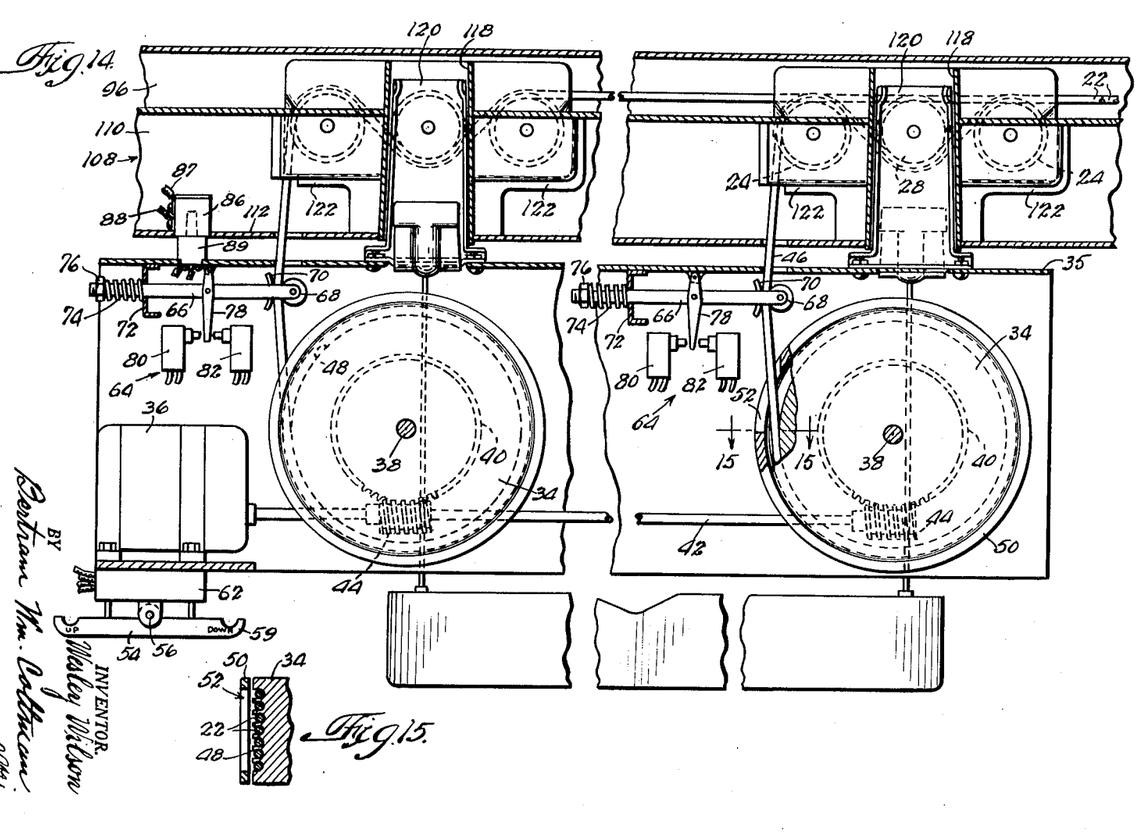
FIG. 14 is an elevational view of a winch which may be employed in the lighting fixture system of FIG. 1, certain details being shown in vertical section.
FIG. 15 is a fragmentary sectional view of a portion of the winch, taken along a plane indicated by a line 15—15 in FIG. 14.

An arrangement is provided to control the motor 36 in response to movement of the rod 66. As illustrated, this arrangement comprises a generally vertical lever 78 pivoted at its upper end on the winch frame 35. The lever 78 is pivotally connected to the rod 66 at a point between the opposite ends of the lever.

Each of the levers 78 may be adapted to operate control means which may comprise a pair of switches 80 and 82 positioned on opposite sides of the lower end of the lever 78. Movement of the lever 78 to the left (FIG. 14) will operate the switch 80 while opposite movement of the lever 78 will operate the switch 82. Thus, the switch 80 will be operated if the tension of the cable 22 should decrease materially from its normal value, while the switch 82 will be operated by any material increase in the tension in the cable 22.

Figure 16:
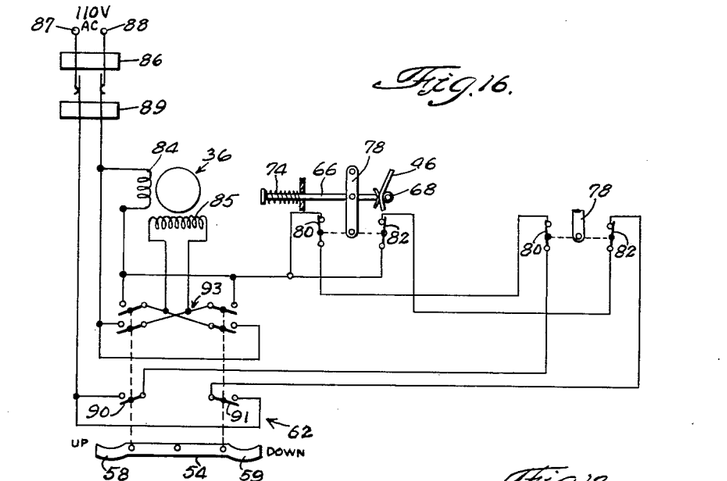
FIG. 16 is a circuit diagram showing the electrical arrangement of the winch.

The drive motor 36 for the winch 30 may be of the split phase type and thus may comprise two windings 84 and 85 (FIG. 16). It will be understood that the motor 36 may be reversed simply by reversing the relative polarities of the windings 84 and 85. Power for operating the motor 36 may be obtained from a conventional 110 volt alternating current supply comprising line wires 87 and 88. The winch 30 may be disengageably connected to the line wires 87 and 88 by means of separable connector elements comprising an overhead supported receptacle 86 and a plug 89 on the winch 30. The switching mechanism 62 may comprise a pair of normally open single pole switches 90 and 91 adapted to be operated by the rocker 54. The arrangement may be such that the switches 90 and 91 will be operated when the hooks 59 and 58 are respectively pulled down. In order to control the direction of operation of the motor 36, the switching mechanism 62 may be provided with a reversing switch 93 adapted to reverse the relative polarities of the windings 84 and 85. As illustrated, the winding 85 will be connected in parallel with the winding 84 in one relative polarity when the hook 58 is pulled down, and in the opposite relative polarity when the hook 59 is pulled down. The arrangement may be such that the winch 30 will tend to reel in the cables 22 when the hook 58 is pulled down, and unreel the cables 22 when the hook 59 is pulled down.

The switches 80, 82, 90 and 91 are connected so that the motor 36 will be stopped in the event that a condition of excessive or insufficient tension develops in the cables 22. However, the arrangement of these switches is such that it will be possible to reverse the motor 36 after it has been stopped by the existence of excessive or insufficient tension, so that the condition of abnormal tension may readily be corrected. As shown, the line wire 88 is connected directly to one side of the winding 84 and is adapted to be connected through the reversing switch 93 to one side of the winding 85. The two switches 80, which are normally closed, are connected in series with the switch 90 to form a circuit extending from the other line wire 87 to the other side of the winding 84, and thence though the reversing switch 93 to the other side of the winding 85. The two switches 82, also normally closed, are connected in series with the switch 91 to form an alternate circuit extending from the line wire 87 to the windings 84 and 85. Thus, if the switch 91 is closed to run the motor 36 in such a direction as to reel in the cable, and if one of the switches 82 should be opened in response to the existence of excessive tension in one of the cables 22, the motor 36 may be reversed to relieve the excessive tension simply by opening the switch 90 and then closing the switch 91. Likewise, if the switch 90 is held closed and the cables 22 are thereby unreeled to such an extent that slack develops in the cables 22, one or both of the switches 80 will be opened so as to stop the motor 36, but the slack may be taken up simply by closing the switch 90 so as to reverse the motor 36 and thus reel in the cables 22.

Provision is made for hanging the overhead fixture system in such a manner as greatly to facilitate the erection of the system. In the present instance, the entire overhead fixture system is supported on an overhead track 96 (FIG. 2) in the form of an inverted sheet metal channel having its lower edges formed into L-shaped flanges 98 extending inwardly and then upwardly. The track 96 may be secured to the ceiling or other overhead support by means of suitable fasteners 100 such as screws, nails or concrete anchors. To facilitate installation, the track 96 may be made in long sections so that the fasteners 100 may be spaced relatively far apart. In this way, the hanging of the track 96 will require a minimum number of ladder settings. Because of their channel-shaped cross section, the sections of the track 96 will be light in weight yet relatively rigid.

The adjacent sections of the track 96 may be joined by means of U-shaped clips 102 (FIGS. 3–5) disposed in longitudinal, aligned slots 104 formed in the ends of the side walls of the track sections. The clips 102 may be secured to the track sections by means of bolts 106 or the like. The clips 102 assure absolute alignment between the L-shaped flanges 98 on the adjacent sections of the track 96.

Suspended on the track 96 is a tubular raceway 108 (FIG. 2) in the form of an inverted channel 110 closed at the bottom by a removable cover 112. Hanger plates 114 are secured at frequent intervals to the top of the raceway 108. The side edges of the hanger plates 114 are provided with inverted U-shaped flanges 116 adapted to ride on the L-shaped flanges 98 on the track 96. The raceway 108 may be made in sections of convenient length. In erecting the raceway 108, the sections of the raceway 108 may be slid successively onto the track 96 at one end. Each newly installed section of the raceway 108 may be employed to push the previously installed sections down the track 96 so that all of the sections of the raceway 108 may be installed from a single ladder setting at one end of the track 96. As will appear in greater detail shortly, the necessary wiring for the lighting fixture system may be installed in the successive sections of the raceway 108 as they are added to the track 96. The raceway 108 is installed on the track 96 before the fixtures 20 are put in place so that at this time the raceway 108 is relatively light in weight and may readily be pushed along the track 96. After the fixtures 20 are mounted on the raceway 108, their added weight prevents subsequent movement of the raceway 108 along the track 96.

The lighting fixture system is provided with means for maintaining the fixtures 20 and the winch 30 in predetermined elevated positions relative to the raceway 108. In the illustrated system, the means for this purpose comprise a plurality of interengageable guide elements, one set on the raceway 108 and another set on the fixtures 20 and the winch 30. Thus, the raceway 108 is provided with a plurality of spaced generally vertical downwardly flaring guide sleeves 118 (FIGS. 12 and 13) of generally rectangular cross section. The guide sleeves 118 extend upwardly into the channel-shaped track 96 through openings in the top of the raceway 108, and also downwardly through openings in the bottom cover 112. Mounted on the fixtures 20 and winch 30 are upwardly tapering guide plugs 120 adapted to be telescopically received in the guide sleeves 118. The illustrated fixtures 20 and the winch 30 are provided with respective pairs of the guide plugs 120, mounted on top of the fixtures 20 and the winch 30, adjacent their opposite ends. Each guide sleeve 118 is formed with a pair of pulley housings 122 projecting longitudinally of the raceway 108 from the guide sleeve 118. As shown, the overhead pulleys 24 are rotatably mounted in the pulley housings 122.

Figure 12:
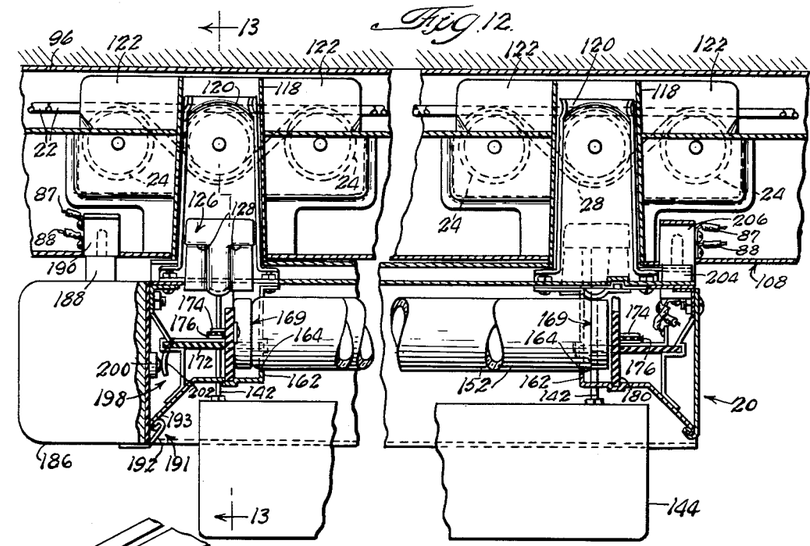
FIG. 12 is a longitudinal broken line sectional view of the lighting fixture shown in its raised position and in engagement with the overhead supporting structure, the view being taken generally along a broken line 12—12 in FIG. 13.
Figures 13, 18:
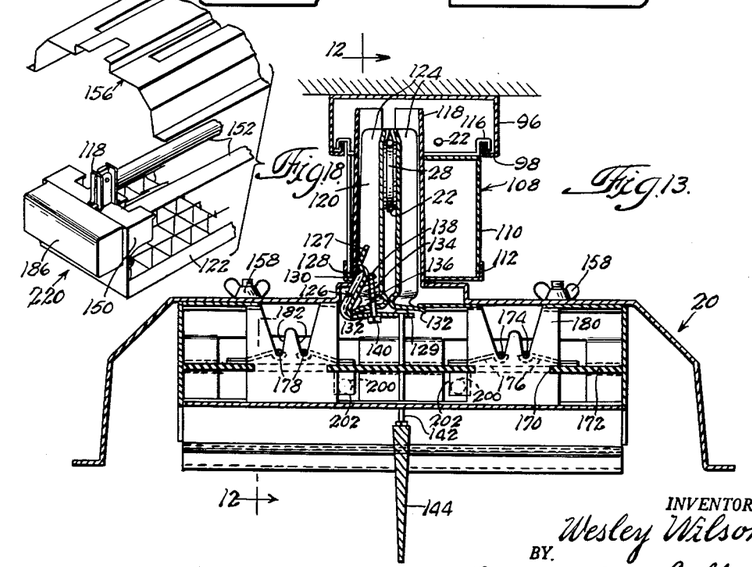
FIG. 13 is a transverse vertical sectional view of the fixture engaged with the overhead supporting structure, the view being taken generally along a plane indicated by a line 13—13 in FIG. 12.
FIG. 18 is a fragmentary perspective view of a modified fixture construction.

Each of the illustrated guide plugs 120 comprises a pair of channels 124 secured together in spaced, back-to-back relation. The fixture and winch pulleys 28 are rotatably mounted in the respective spaces between the channels 124. The suspension loops 26 in the cables 22 extend downwardly from the pulleys 24 through the guide sleeves 118 and under the pulleys 28. When the plugs 120 and the sleeves 118 are engaged, the cables 22 extend downwardly at an angle of about 45° between the pulleys 28 and 24. The horizontal flights of the cables 22, extending between the guide sleeves 118, run above the top of the raceway 108 inside the channel-shaped track 96. In order to avoid contact between the two cables 22, the guide sleeves 118 for the respective cables 22 are offset from the center of the raceway 108 toward its opposite sides. In other words, the guide sleeves 118 are alternately staggered toward opposite sides of the raceway 108. As will appear in greater detail shortly, this arrangement has the additional advantage of providing ample space for the passage of electrical wiring along the raceway 108.

Provision may be made in the system for releasably securing or latching the fixtures 20 and the winch 30 in overhead positions. For this purpose, the illustrated system may be provided with latching means comprising a plurality of latches 126 (FIG. 13) mounted on the respective guide plugs 124 and adapted to interlock with the guide sleeves 118. However, for reasons to appear below, the latches 126 may be omitted from the fixture 20a nearest the winch 30, or some other single one of the fixtures 20. As shown, each of the latches 126 is generally L-shaped and comprises an upwardly extending leg 127 and a generally horizontal lower leg 129. Formed on the upper leg 127 are a pair of aligned downwardly facing shoulders or lips 128 adapted to engage inwardly projecting latch abutments or ears 30 struck out of one side of the guide sleeve 118. Each of the channels 124 making up the guide plug 120 is provided with an outwardly bent generally horizontal mounting flange 132 whereby the guide plug 120 may be secured to the top of the winch 30 or lighting fixture 20. The L-shaped latch 126 is hooked over the mounting flange 132 on one of the channels 124 so that the upper leg 127 of the latch 126 will extend upwardly along the channel 124, while the lower leg 129 extends generally horizontally underneath the plug member 120. The latch 126 is biased into interlocking relation with the ears 30 by means of a compression coil spring 134 positioned around a screw 136 extending in a generally vertical direction through generally aligned openings in the flange 132 and the horizontal leg 129 of the latch 126. The screw 136 is provided with a head 138 disposed above the flange 132 and a nut 140 located below the horizontal leg 129 of the latch 126. The spring 134 is interposed between the head 138 of the screw 136 and the flange 132. It will be noted that the spring 134 and the screw 136 serve to retain the latch 126 on the flange 132.

To release the latches 126, depending pull rods 142 may be connected to the horizontal legs 129 on the latches. The pull rods 142 at the opposite ends of the fixtures 20 and the winch 30 are joined by respective horizontal release bars 144 having respective centrally-disposed upwardly facing notches 146 adapted to be engaged by a long hooked pole or other similar releasing instrument. At the opposite ends of the fixtures 20 and the winch 30, the latches 126 may be disposed on opposite sides of the staggered guide plugs 120 so that the pull rods 142 and release bars 144 will be longitudinally aligned and located on center relative to the raceway 108 and the fixtures 20. This arrangement also has the advantage of insuring that the fixtures 20 and the winch 30 will be held on an even keel by the latches 126 without substantial tilt from side by side. As shown, the release bars 144 may be arranged to act as light shields or deflectors, as well as latch-releasing elements.

The detailed construction of the lighting fixtures 20 may be such as to facilitate assembly of the fixtures 20 and secure numerous operational advantages. Each fixture 20 preferably includes two lamp sock units 150 and 151, mounted at the opposite ends of the fixture and adapted to support the ends of tubular fluorescent lamps 152. Each of the illustrated fixtures will accommodate two of the lamps 152. The lamp socket units 150 may be joined together in spaced-apart relation by means comprising a shallow, rigid tie channel 154, bolted or otherwise detachably secured to the socket units 150. Thus, the fixture may readily be shipped unassembled. As will appear in detail below, the fixture 20 may be arranged so that assembly of the fixture 20 in the field will involve only mechanical operations, all electrical connections having been made within the socket units 150 and 151 in the course of their manufacture.

Figures 6, 8:
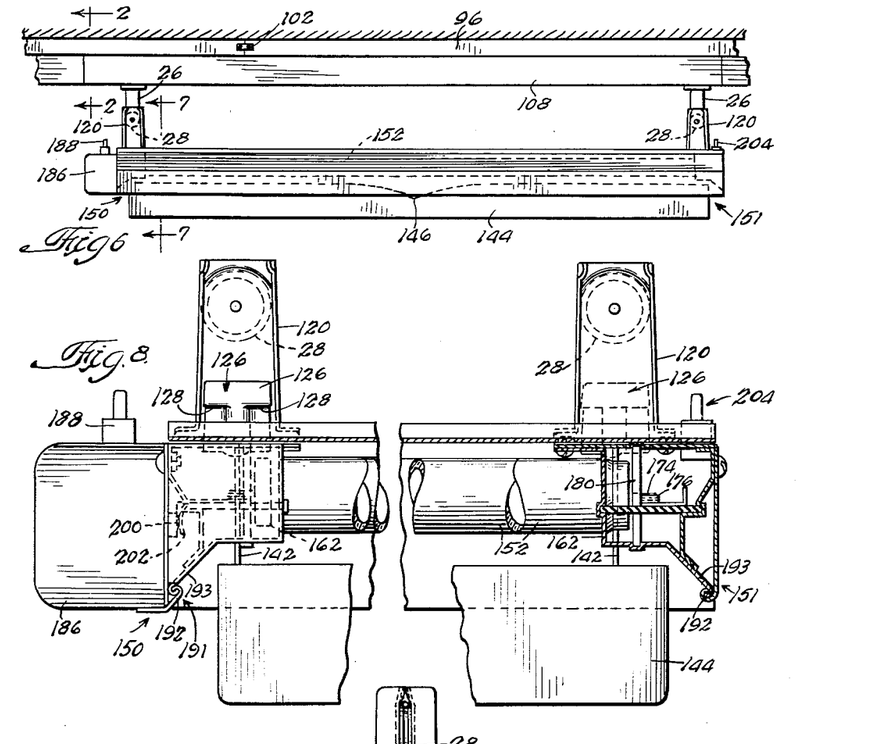
FIG. 6 is a general side elevational view of a lighting fixture which may be employed in the system of FIG. 1, the fixture being shown in slightly lowered relationship to the overhead supporting structure of FIG. 2.
FIG. 8 is an enlarged elevational view, partly in section along a plane indicated by a line 8—8 in FIG. 7.
Figure 7:
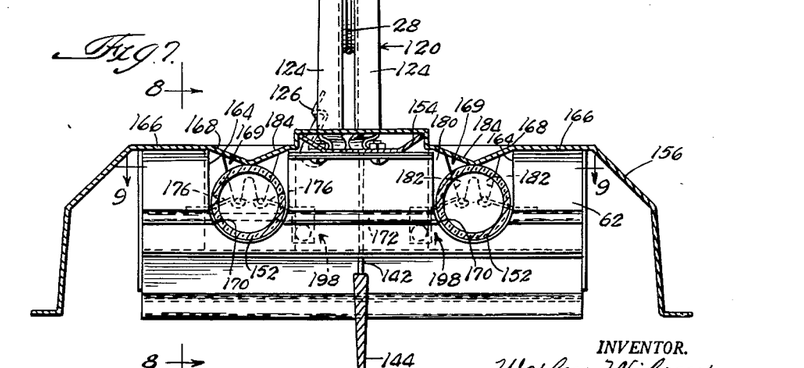
FIG. 7 is a transverse vertical sectional view of the fixture taken along a plane indicated by a line 7—7 in FIG. 6.
Figure 9:
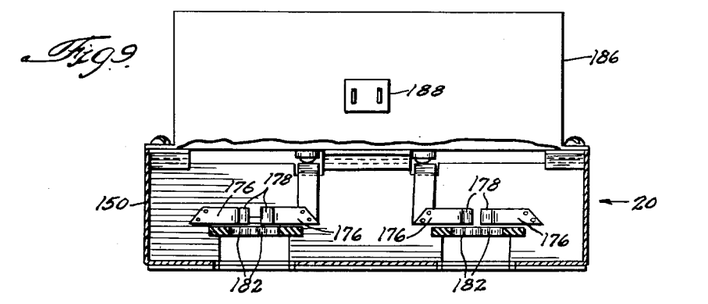
FIG. 9 is a fragmentary horizontal sectional view of the fixture taken along a plane indicated in FIG. 7 by a line 9—9.
Figure 10:
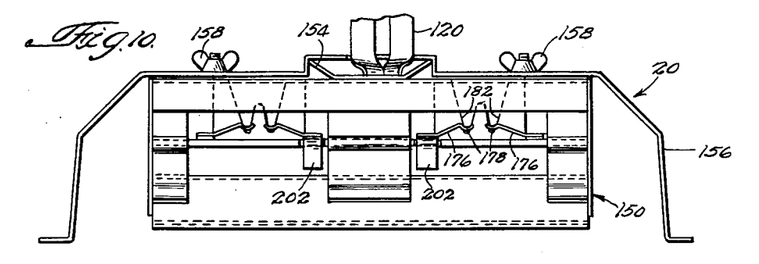
FIG. 10 is an end view of the fixture with a lamp ballast removed to reveal certain constructional details.

Each of the fixtures 20 is so arranged that the fluorescent lamps 152 will be retained in the lamp socket units 150 and 151 by the removable reflector 156. With this arrangement, the lamps 152 cannot be removed from the fixture 20 when the latter is in its elevated position. To remove the reflector 156 or the lamps 152 it will be necessary to lower the fixture 20. As will be clear shortly, this will automatically break the electrical circuit to the fixture 20 so that there will be no shock hazard in changing the lamps 152 or cleaning the reflector 156. In the illustrated construction, each lamp socket unit 150 or 151 is provided with a front plate 162 and a top plate 166 (FIGS. 7 and 8). Formed in the plates 162 and 166 are respective aligned upwardly-opening notches or slots 164 and forwardly-opening notches or slots 168 for receiving the ends of the tubular lamps 152. The notches 164 and 168 define recesses 169 adapted to receive the lamps 152. The lamps 152 actually rest in notches 170 formed in a horizontal insulating plate 172 mounted inside each socket unit 150 or 151. The width of the notches 170 is made smaller than the diameter of the lamps 152 so that the lamps will rest in the notches 170 without passing through. The illustrated lamps 152 are of the conventional type having a pair of filament terminal pins 174 at each end. Spring contacts 176 are mounted on the insulating plate 172 to engage the pins 174. As shown, the contacts 176 are provided with hooked end portions 178 adapted to support the pins 174. To insure proper alignment between the pins 174 and the hooked portions 178, a generally vertical insulating guide plate 180 is interposed between the spring contacts 176 and the lamps 152. Formed in the plate 180 are upwardly-opening, V-shaped guide notches 182 converging downwardly toward the hooked end portions 178 of the spring contacts 176. The notches 182 serve to guide the pins 174 downwardly into the proper relationship with the spring contacts 176 when the lamps 152 are installed.

The lamps 152 are retained in the lamp socket units 150 and 151 by means of downwardly-extending V-shaped projections 184 (FIG. 7) formed on the reflector 156 and adapted to engage the ends of the lamps 152. The weight of the reflector 156 serves to press the lamps downwardly into engagement with the insulating plate 172 and thus insures positive electrical contact between the pins 174 and the spring contacts 176.

Provision is made for supplying electrical power to operate the lamps 152. For this purpose, each of the illustrated fixtures 20 is provided with a ballast 186 (FIG. 12) mounted at one end of the fixture 20 on the lamp socket unit 150. Mounted on the ballast 186 is a two-contact electrical plug 188 adapted to engage a corresponding receptacle 190 mounted on the raceway 108. The receptacle 190 may be connected to the line wires 87 and 88 of the 110 volt alternating current supply. As shown in FIG. 12, the line wires 87 and 88 may extend inside the raceway 108 between the successive receptacles 190 for the various fixtures 20. A plurality of pairs of line wires may be utilized, if desired, in order that the fixtures 20 may be divided into a plurality of groups under the control of separate switches. FIG. 2 clearly indicates that the off-center arrangement of the guide sleeves 118 provides ample space for threading the line wires 87 and 88 through the raceway 108.

In order to facilitate assembly of the ballast 186 and the lamp socket unit 150, the ballast 186 may be mounted on the lamp socket unit 150 by means of a separable hinge 191 (FIG. 12) comprising interengageable hooked elements 192 and 193 secured to the lower portions of the ballast 186 and the lamp socket unit 150, respectively. Suitable fasteners 196, such as bolts or the like, may be provided to secure the upper portion of the ballast 186 to the lamp socket unit 150. Thus, the ballast 186 may be detached by removing the fasteners 196, swinging the ballast 186 downwardly about the hinge 191, and finally separating the hooked elements 192 and 193.

The ballast 186 may be connected electrically to the lamps 152 by means of a pair of separable electrical connectors 198, which may include respective button contacts 200 mounted on the ballast 186 and spring contacts 202 mounted on the horizontal insulating plate 172 and electrically connected to the spring contacts 176. The spring contacts 202 are normally flexed when the ballast 186 is in place on the lamp socket unit 150 so that positive electrical connections between the ballast 186 and the lamps 152 are assured. The separable connectors 198 eliminate any need for wiring between the ballast 186 and the lamp socket unit 150.

At the end of the fixture 20 opposite the ballast 186, the lamp socket unit 151 is provided with an upwardly-projecting two-prong plug 204 for connecting the opposite ends of the lamps 152 to the alternating current supply. The plug 204 is adapted to engage a corresponding receptacle 206 mounted on the raceway 108 and connected to the line wires 87 and 88.

Figures 17, 20:
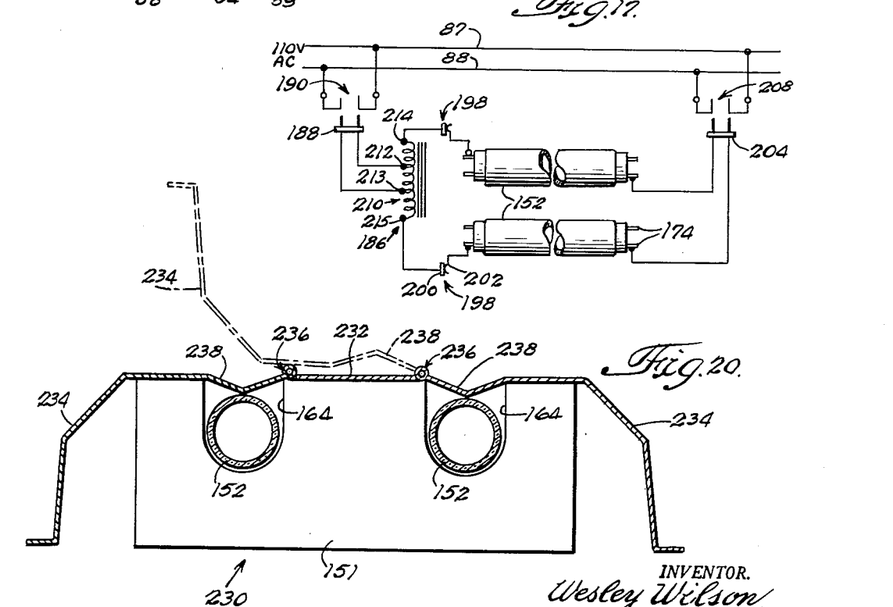
FIG. 17 is a circuit diagram of one of the lighting fixtures.
FIG. 20 is a transverse vertical sectional view of still another modified fixture.

The arrangement of the fixture 20 may be such as to eliminate all need for wiring extending between the lamp socket units 150 and 151. As shown in FIG. 17, the ballast 186 may be of the high voltage type, comprising a step-up auto-transformer 210 having a pair of low voltage terminals 212 and 213 connected to the plug 188 and thence by means of the receptacle 190 to the line wires 87 and 88. The auto-transformer may be connected by means of the separable connectors 198 to one terminal pin 174 at one end of each lamp 152. One terminal pin 174 at the other end of each lamp 152 may be connected to the plug 204 and thence through the receptacle 208 to the line wires 88 and 87, respectively. Thus, the necessary connections between the opposite ends of the lamps 152 are made through the line wires 87 and 88 in the raceway 108 rather than by means of wiring on the fixture 20 itself. In this way, the fixture 20 may be shipped unassembled and then assembled in the field without installing any wiring in the fixture 20.

While the operation of the lighting fixture system shown in FIGS. 1–15 will be clear from the foregoing description, it may be well to summarize the operation briefly. When any or all of the fixtures 20 are to be lowered for cleaning or other maintenance, the winch 30 is set into operation by pulling downwardly on the hook 59 with a long hooked pole or other suitable hand tool. This will close the switch 90 and thus supply power to the motor 36 through the normally closed safety switches 80. At the same time, the reversing switch 93 will be operated in a direction such that the winch 30 will pay out the cables 22. This will result in the lowering of the first fixture 20a. The latches 126 on the other fixtures 20 will hold them in their overhead positions adjacent the raceway 108.

The fixture 20a will be lowered to a point within easy reach of the operator at the floor level. The operator may stop the winch 30 either by removing the pole from the hook 59 or by catching the fixture 20a in his arms. Catching the fixture 20 and 20a will relieve the tension in the cables 22 so that the tension-responsive members 66 will be free to move up to the left (FIG. 14) under the biasing action of the springs 74. This will open the safety switches 80 and thereby disconnect the motor 36 from its electrical power supply. It will be apparent that the operator may accurately and readily control the position to which the first fixture 20a is lowered. As will appear below, the lowered position of the first fixture 20a will also determine the level to which the other fixtures 20 will be lowered.

After the first fixture 20a has been lowered, it will serve as a counterweight for lowering any other fixture 20. For example, the fixture 20b may be lowered by pulling down on its release bar 144 with the hooked pole, so as to release the latches 126. Initially, the fixture will drop slightly, but the weight of the fixture 20b will then be taken up by the cables 22. The initial drop will be sufficient to give a positive indication that the latches 126 have been released, but will not be unduly abrupt inasmuch as the cables 22 extend downwardly at a fairly steep angle between the overhead pulleys 24 and the fixture pulleys 28 even when the fixture 20b is in its fully elevated position. The hooked pole may be utilized to pull the second fixture 20b downwardly to the floor level. This will raise the first fixture 20a to its fully elevated position.

After the second fixture 20b has been cleaned and serviced, the third fixture 20c may be lowered by pulling downwardly on its release bar 144. This will raise the second fixture 20b toward its elevated position. While the second fixture 20b is being raised, it may be leveled by manipulating the third fixture 20c. It will be understood that pulling downwardly on one end of the third fixture 20c will exert extra tension on one of the cables 22 and thereby raise the corresponding end of the second fixture 20b. The second fixture 20b may be latched in its overhead position by pulling downwardly with extra force on the third fixture 20c.

Once the first fixture 20a has been lowered, any other fixture 20 may be lowered by releasing its latches 126 and pulling it downwardly to the floor level with the hooked pole. This will raise the first fixture 20a which will serve as a counterweight. If the fixture 20 being lowered is remote from the first fixture 20a, the cables 22 will have to be pulled around the pulleys 24 and 28 for the various intermediate fixtures 20. However, this may readily be done because of the extreme flexibility of the airplane-type cables 22, even though the cables run downwardly and then upwardly around the fixture pulleys 28 at angles of about 45°.

It will be evident that any fixture 20, once lowered, may be employed as a counterweight for lowering any one of the other fixtures 20. When all of the desired fixtures 20 have been successively lowered and serviced, the last one to be lowered may be raised by means of the winch 30. The winch 30 will reel in the cables 22 if the hook 58 is pulled down by means of the hooked pole. This will close the switch 91 and thus apply power to the motor 36 through the safety switches 82. The winch 30 will draw up the cables 22 tightly enough to latch the fixture 20 in its fully elevated position, assuming that one of the fixtures 20 other than the first fixture 20a is being raised. Since the first fixture 20a is not provided with latches, it will merely be raised to its fully elevated position and held in place adjacent the raceway 108 by the tension in the cables 22. If the switch 91 is not immediately opened after the fixture being raised has reached its fully elevated position, continued operation of the winch 30 will result in an increase in the tension in the cables 22. As a result, one or both of the tension-responsive members 66 will be pulled to the right (FIG. 14) against the biasing action of the spring 74. This will open one or both of the safety switches 82 and thereby stop the motor 36. Breakage of the cables 22 will thereby be avoided. Although the motor 36 will not again run in a direction such as to reel in the cables until the tension in the cables is reduced, the motor may be operated in the opposite direction merely by pulling down on the hook 59 which will close the switch 90 and supply power to the motor through the normally closed switches 80.

Relatively heavy lighting fixtures 20 may be employed in the system because each of the fixtures 20 is carried by two separate cables. Moreover, the provision of the two cables 22 affords an extra measure of safety inasmuch as one of the cables will prevent any of the fixtures 20 from falling if the other cable 22 should break.

The provision of two separate cables 22 having respective suspension loops 26 supporting the individual fixtures 20 tends to minimize swinging of the fixtures while they are being raised or lowered. Since the opposite ends of the fixtures 20 are supported separately, the fixtures need not be in balance. Thus, in the illustrated fixtures 20, the ballast 186 at one end of the fixture will tend to make that end considerably heavier than the other. Nevertheless, the fixtures 20 can be elevated and lowered without appreciable tipping since the heavy and light ends of all the fixtures are supported by separate cable systems.

Occasionally, it will be desirable to lower the winch 30 for maintenance. When this is to be done, the first step will be to lower the first fixture 20a by paying out the cable 22 from the winch 30. Another fixture 20, such as the second fixture 20b, may then be lowered by releasing its latches 126 and paying out additional cable from the winch 30. The second fixture 20b need be lowered only halfway. After these preliminary operations, the winch 30 may be lowered by pulling down on its release bar 144 with the hooked pole. This will release the latches 126 on the winch 30 whereupon the winch may be pulled down to the floor level. The two fixtures 20a and 20b will act as counterweights for the winch 30 and will be raised by the downward movement of the winch. Since the winch 30 is supported by three flights of each cable 22, while each of the two fixtures 20a and 20b is supported by two flights, it will be understood that the weight of the winch should be made fifty percent greater than the weight of each fixture 20. Lowering the winch 30 will disengage the plug 89 from the receptacle 86 and thereby disconnect the winch 30 from the power line wires 87 and 88. Thus, there will be no shock hazard in servicing the winch 30. If it is desired to operate the winch 30 for testing purposes while it is lowered, the winch may readily be supplied with power by means of an extension cord.

When one of the fixtures 20 has been lowered, the reflector 156 may be removed for cleaning by unscrewing the wing nuts 158 and lifting the reflector away from the tie channel 154 and the lamp socket units 150 and 151. With the reflector 156 removed, the fluorescent lamps 152 may be lifted freely out of the lamp socket units 150 and 151. New lamps 152 may be installed simply by laying the lamps in the fixture 20. The notches 182 in the plates 180 will guide the contact pins 174 of the lamps 152 into the proper contacting relation with the spring contacts 176. When the reflector 156 is replaced, it will press the lamps 152 downwardly and thereby flex the spring contacts 176 to insure positive electrical contact. The lamps will rest in the notches 170 formed in the plate 172.

It will be evident that the reflector 156 may not be lifted off the fixture 20 when the latter is in its fully elevated position adjacent the raceway 108. Thus, it will be impossible to remove the lamps 152 when the fixture 20 is elevated. The shock hazard which would be attendant upon such removal of the lamps 152 is thereby avoided. When the fixture 20 is lowered for servicing, the plugs 188 and 204 are automatically disengaged from the receptacles 190 and 206 so that the reflector 156 and the lamps 152 may be removed without any shock hazard.

When each of the fixtures 20 is raised, the interengaging guide sleeves 118 and guide plugs 120 will accurately position the fixture relative to the raceway 108 so that the electrical plugs 188 and 204 will readily be re-engaged with the receptacles 190 and 206.

FIG. 18 shows a modified fixture 220 in which the lamp socket units 150 and 151 are joined in spaced-apart relation by means of a rigid "egg crate" type louver panel 221 mounted below the fluorescent lamps 152 in a position to diffuse the light from the lamps and to shield the lamps from direct view. By providing the panel 221, the tie channel 154 employed in the embodiment of FIGS. 1–17 may be eliminated.

Figures 11, 19:
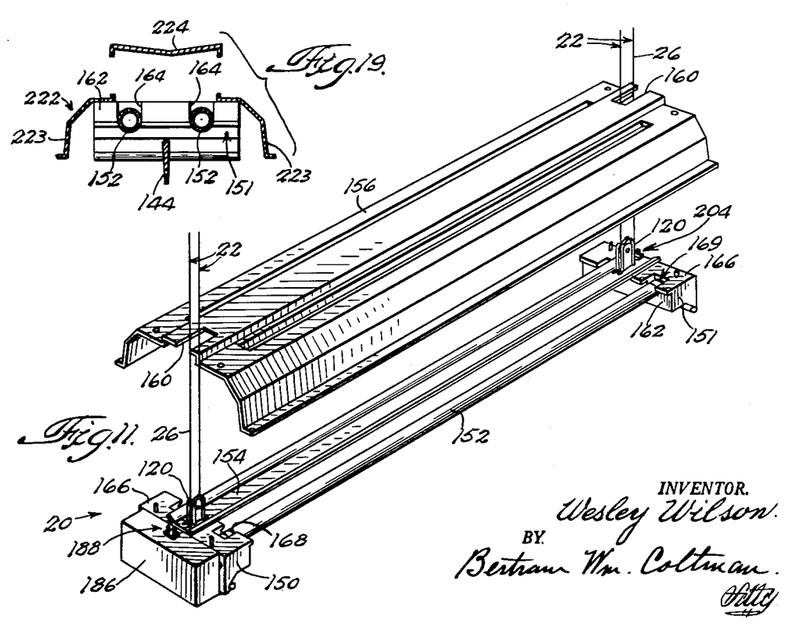
FIG. 11 is a general perspective view of the lighting fixture, a reflector element being shown in disengaged relation to the remainder of the fixture.
FIG. 19 is a transverse vertical sectional view of another modified fixture construction.

FIG. 19 illustrates another modified fixture 222 in which the lamp socket units 150 and 151 are connected together by means of downwardly flanged reflector elements 223 overhanging the opposite sides of the lamp socket units. The reflector elements 223 may be bolted or otherwise secured to the socket units 150 and 151. To retain the lamps 152 in the socket units 150 and 151, the modification of FIG. 19 is provided with a detachable reflector panel 224 adapted to cover the top of the fixture and thereby close the notches 164 in the front panel 162 of the socket units 150 and 151. The panel 224 may not be removed when the fixture 222 is fully elevated, but may readily be removed for cleaning and lamp replacement when the fixture is lowered.

FIG. 20 illustrates still another modified fixture 230 in which the lamp socket units 150 and 151 are connected together by means of a central, horizontal reflector panel 232 extending longitudinally between the socket units. On either side of the fixture 230, downwardly flanged reflector elements 234 are connected to the edges of the reflector panel 232 by means of hinges 236. The flanged reflector elements 234 are arranged so as normally to cover the slots 164 and thereby retain the lamps 152 in the socket units 150 and 151. For pressing the lamps downwardly, the elements 234 are provided with downwardly-extending V-shaped projections 238. When the lamps 152 are to be changed, the flanged reflector elements 234 may be swung upwardly on the hinges 236 to the position indicated in dotted lines in FIG. 20. This will uncover the slots 164 so that the lamps 152 may readily be lifted out of the socket units 150 and 151. It will be evident that the hinged elements 234 may not be fully raised when the fixture 230 is in its elevated position adjacent the raceway 108. Consequently, the fixture 230 must be lowered to remove the lamps 152 and all danger of electrical shock is thereby eliminated.

Figure 21:
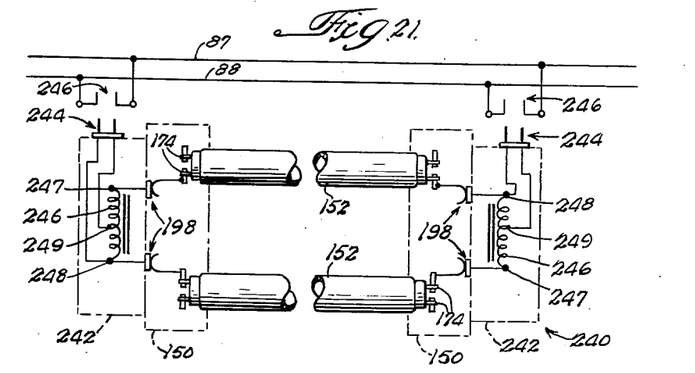
FIG. 21 is a diagrammatic view of a modified fixture utilizing two lamp ballasts mounted at the opposite ends of the fixture.

FIG. 21 illustrates a modified fixture 240 which may employ two of the lamp socket units 150 at the opposite ends of the fixture. Each lamp socket unit 150 may be provided with a high voltage lamp ballast 242, which may be mounted on the socket unit in the same manner as the ballast 186 of FIGS. 1–17. Mounted on each ballast 242 is a plug 244 adapted to engage a receptacle 246 mounted on the raceway 108 and connected to the power line wires 87 and 88. Each ballast 242 comprises an auto-transformer 246 having a high voltage end terminal 247, a low voltage end terminal 248 and a tap 249. The taps 249 on both auto-transformers 246 are connected to the same line wire, illustrated as the wire 87. The opposite ends of each lamp 152 are connected respectively to the high voltage end terminal 247 on one auto-transformer 246 and the low voltage end terminal 248 on the other auto-transformer 246. The connections between the ballasts 242 and the lamp socket units 150 may be made by the separable electrical connectors 198, as in the embodiment of FIGS. 1–17.

It will be apparent that all necessary connections between the ends of the lamps 152 are made through the line wires 87 and 88 in the raceway 108. In this way there is no need for wiring extending between the opposite ends of the lamps 152 on the fixture 240.

Figure 22:
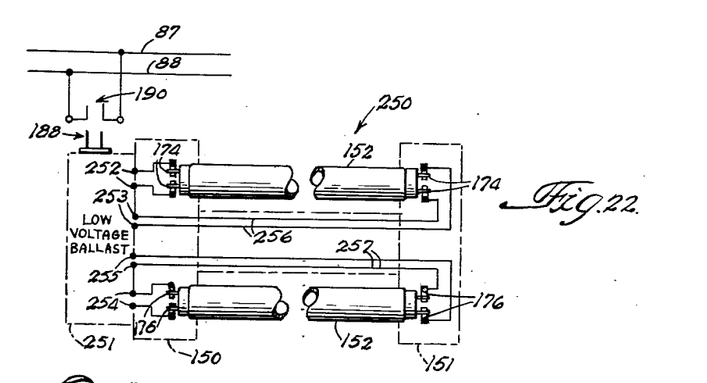
FIG. 22 is a diagrammatic view of another modified fixture having a low voltage ballast.
Figures 23, 24:
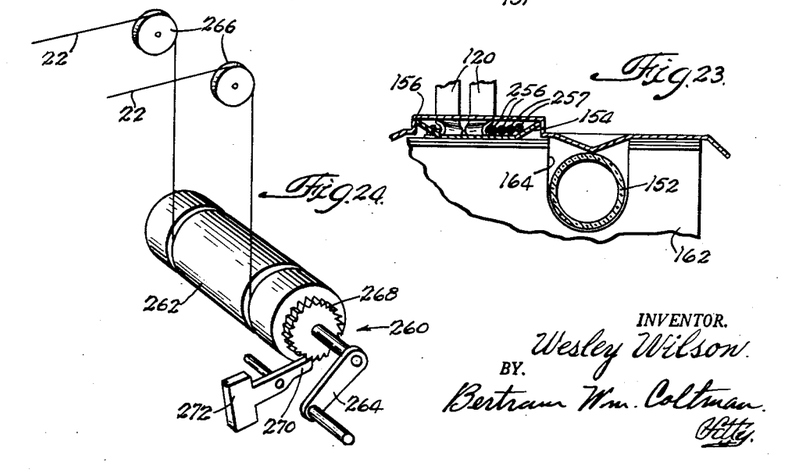
FIG. 23 is a fragmentary, transverse vertical sectional view of the fixture of FIG. 22.
FIG. 24 is a somewhat diagrammatic perspective view of a modified arrangement for raising and lowering the fixtures of the system.

FIGS. 22 and 23 illustrate a modified fixture 250 utilizing a low voltage ballast 251 which may be of conventional construction. The ballast 251 may be mounted on the lamp socket unit 150 in a manner similar to the mounting of the ballast 186 in the embodiment of FIGS. 1–17. Connections between the ballast 251 and the line wires 87 and 88 may be established by means of the plug 188 and the socket 190, which may be mounted on the ballast and the raceway 108, respectively. To energize the filaments in the lamps 152 so that the lamps may be started with a comparatively low voltage, the ballast 251 may be provided with four pairs of terminals 252, 253, 254 and 255, two pairs of the terminals being provided for each lamp 152. The terminals 252 and 254 may be connected to the spring contacts 176 on the lamp socket unit 150 and thence to the filament terminal pins 174 on the near ends of the respective lamps 152. By means of two pairs of wires 256 extending along the tie channel 154, the terminals 253 and 255 may be connected to the spring contacts 174 on the lamp socket unit 151 and thence to the filament terminal pins 174 on the remote ends of the lamps 152. As shown in FIG. 23, there is ample space in the tie channel 154 for threading the wires 256 and 257 from one end of the fixture 250 to the other.

FIG. 24 shows a modified arrangement for reeling the cables 22 in and out and thereby raising and lowering the fixtures 20. The illustrated arrangement comprises a winch 260 including a winding drum 262 adapted to reel both of the cables 22. The winding drum 262 may be mounted near the floor level and may be operated by means of a hand crank 264. Overhead pulleys 266 are provided to bring the cables 22 downwardly to the winding drum 262. To prevent the cables 22 from being accidentally unwound from the winch 260, the winding drum 262 is provided with a ratchet wheel 268 engageable by a pivoted ratchet 270 which is biased against the ratchet wheel by means of a weight 272.

To lower the first fixture 20a, the ratchet 270 may be released by lifting the weight 272 manually. The cables 22 may then be payed out the desired amount by rotating the drum 262 with the hand crank 264. Further paying out of the cables 22 may then be prevented by re-engaging the ratchet 270 with the ratchet wheel 268. The fixture 20a may again be raised to its fully elevated position by turning the hand crank 264 in the requisite direction (counterclockwise in FIG. 22).

Figures 25, 26, 27, 28:
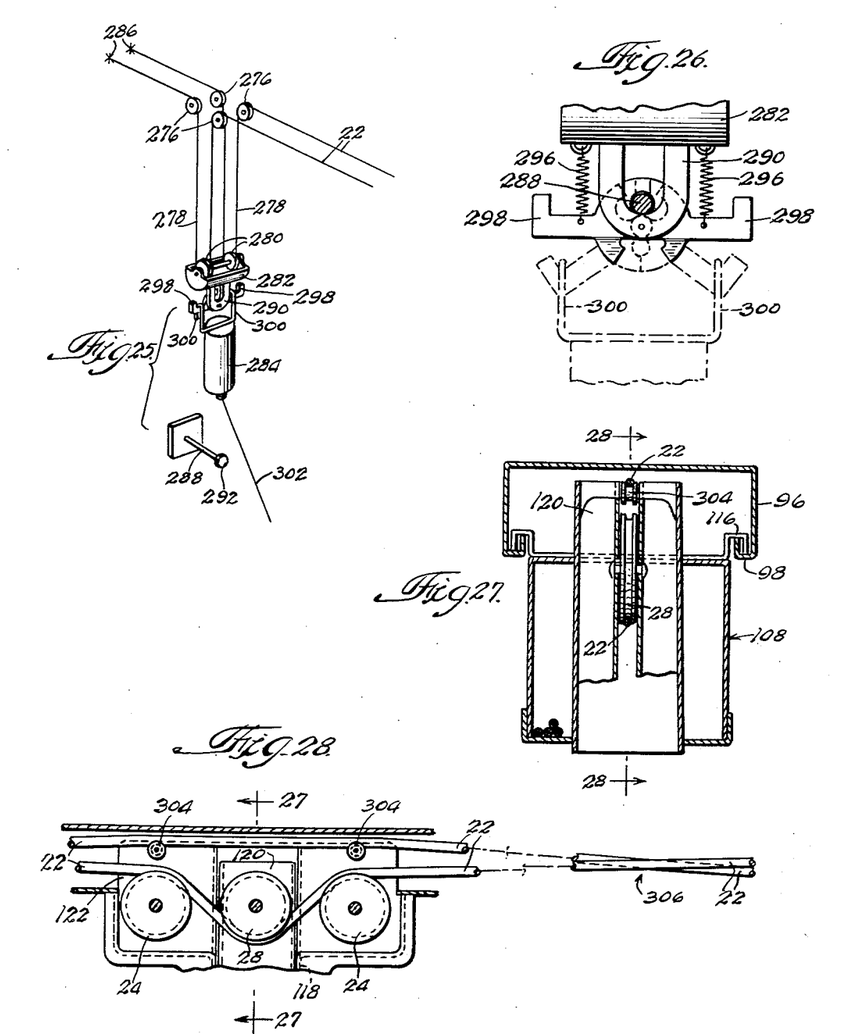
FIG. 25 is a somewhat diagrammatic perspective view of another modified arrangement whereby the fixtures may be raised and lowered.
FIG. 26 is an enlarged fragmentary elevational view showing a portion of the arrangement of FIG. 25.
FIG. 27 is an elevational sectional view of a modified overhead supporting structure, the view being taken along a plane indicated by a line 27—27 in FIG. 28.
FIG. 28 is a longitudinally vertical sectional view of the modified supporting structure taken along a plane indicated by a line 28—28 in FIG. 27.

Another modified arrangement for paying the cables 22 in and out is shown in FIGS. 25 and 26. In this arrangement, each of the cables 22 is pulled downwardly between two overhead pulleys 276 so as to form a suspension loop 278. Supported on the suspension loops 278 are respective sheaves 280 mounted on a sheave block 282, which is adapted to support a detachable, portable counterweight 284. The ends of the cables 22 are anchored, as indicated at 286.

Provision is made for releasably anchoring the sheave block 282 in a position adjacent the floor level so that the counterweight 284 may be detached. For this purpose, the illustrated arrangement comprises a fixed horizontal post 288 which may be mounted on a wall or other suitable support. A downwardly-extending U-shaped member 290 is mounted on the sheave block 282 and is adapted to be hooked onto the post 288. Formed on the post 288 is an enlarged head 292 for retaining the U-shaped member 290 on the post. In order to lock the U-shaped member 290 on the post 288 against accidental removal, the U-shaped member may be provided with a pair of pivoted jaws 294 adapted to grip the post 288. Springs 296 are provided to urge the jaws 294 into gripping engagement with the post 288. Formed on the jaws 294 are respective laterally-extending hooked arms 298 adapted to support the counterweight 284, which may be provided with a pair of hooks 300 for engaging the hooked arms 298. When the counterweight 284 is hooked onto the arms 298, they will be swung downwardly and the jaws 294 will thereby be opened so that the sheave block 282 may then be unhooked from the post 288. Any one of the fixtures 20 may then be pulled down and the counterweight 284 will thereby be raised. A cable 302 may be attached to the counterweight 284 so that the latter may readily be pulled down when the fixture 20 is again to be raised to its normal position adjacent the raceway 108.

FIGS. 27 and 28 illustrate a modified arrangement in which the guide sleeves 118 are arranged on center in the raceway 108. Provision is made for carrying each of the cables 22 around alternate guide sleeves 118 and alternate sets of the overhead pulleys 24. In the illustrated arrangement, respective guides 304 are positioned above the overhead pulleys 24 to support one of the cables 22, the other of the cables 22 being threaded over the pulleys 24 and under the associated fixture pulley 28. As shown, the guides 304 take the form of rivets or the like extending across the tops of the pulley housings 122. With the illustrated construction, the two cables 22 may be in vertical alignment rather than offset as in the embodiment of FIGS. 1–17. It will be understood that the cables 22 will cross each other and rub slightly at a point midway between adjacent guide sleeves 118, as shown at 306, but this slight rubbing contact between the cables will not interfere materially with the operation of the cable system. It will be evident from FIG. 27 that ample space is afforded on both sides of the guide sleeves 118 for threading electrical wiring through the raceway 108.

Without further elaboration, the foregoing will so fully explain the character of my invention that others may, by applying current knowledge, readily adapt the same for use under varying conditions of service, without eliminating certain features, which may properly be said to constitute the essential items of novelty involved, which items are intended to be defined and secured to me by the following claims.

I claim:

1. In an overhead lighting system, the combination comprising a plurality of lighting fixtures, each of said fixtures having first and second pulleys spaced apart horizontally and adapted to support said fixture, means for providing overhead support, a first series of pairs of pulleys mounted on said means above said first pulleys, a first cable running over said overhead pulleys and under each of said first pulleys for supporting one end of each of said fixtures, a second series of pairs of overhead pulleys mounted on said means above said second pulleys, a second cable running over said second overhead pulleys and under each of said second fixture pulleys for supporting the other end of each of said fixtures, means for releasably holding said fixtures in overhead positions, and means for paying said first and second cables in and out for raising and lowering said fixtures, said means being controlled in its operative condition by the tension of said cables.

2. In an overhead fixture system, the combination comprising a plurality of fixtures adapted to be suspended in overhead positions, overhead-supporting means, a flexible tension element engaging said supporting means and defining a plurality of vertically adjustable horizontally spaced loops, respective guide means on said fixtures and carried by said loops for supporting said fixtures thereon, and a winch, said winch including means for reeling and unreeling said tension element and thereby raising and lowering said fixtures and means for disabling said reeling and unreeling means controlled by the tension of said tension elements.

3. In an overhead fixture system, the combination comprising a plurality of elongated flexible tension elements, a plurality of guide means for supporting said tension elements to provide a plurality of vertically adjustable loops in said tension elements, both ends of each loop being supported overhead, a plurality of vertically adjustable fixtures carried on said loops, and a power-operated winch disposed in overhead position for reeling and unreeling said tension element and thereby raising and lowering said fixtures, and means responsive to the tension in said tension elements for disabling said winch.

4. In an overhead fixture system, the combination comprising a plurality of overhead guides arranged in pairs, a plurality of fixtures adapted to be suspended in overhead positions, each of said fixtures having guide means, a flexible tension element extending over said overhead guides and looped under said fixture guide means for supporting said fixtures, a winch for reeling and unreeling said tension element and thereby raising and lowering said fixtures, means for bodily raising and lowering said winch including additional overhead guiding means defining an additional loop in said tension element, means on said winch for supporting said winch on said additional loop, and means responsive to the tension in said tension element for disabling said winch.

5. In an overhead fixture system, the combination comprising a plurality of overhead guides, an elongated flexible tension element supported on said guides and having intermediate portions extending between said guides and adapted to be pulled downwardly to form loops in said tension element, a plurality of fixtures for engaging said intermediate portions and adapted to be suspended on said loops, means for releasably holding said fixtures in overhead positions adjacent said guides, an electrically operable winch for reeling one end of said tension element in and out and thereby raising and lowering said fixtures, means for suspending said winch on said flexible tension element, means for releasably holding said winch in overhead position, separable electrical connecting means for supplying electrical power to said winch so that said winch may be lowered by first lowering one of said fixtures, releasing the last mentioned means, and pulling said winch down manually.

6. In an overhead fixture system, the combination comprising a plurality of horizontally spaced guides in overhead positions, a tension element supported on said guides and having intermediate portions extending between said guides and adapted to be pulled downwardly to form vertically adjustable loops, a plurality of vertically adjustable fixtures for engaging said intermediate portions and adapted to be suspended on said loops, a power-operated winch for reeling said tension element in and out and thereby raising and lowering said fixtures, and means responsive to tension in said tension element for disabling said winch in the event of either excessive or insufficient tension in said tension element and thereby preventing either breakage or undue slack in said tension element.

7. In an overhead fixture system, the combination comprising a flexible overhead-supported tension element for providing a plurality of vertically adjustable loops, a plurality of fixtures supported on said loops, a power-operated winch for reeling said tension element in and out and thereby raising and lowering said fixtures, means defining a flight in said tension element, a member engaging said flight and movable transversely thereof, yieldable means for biasing said member in one direction transversely of said flight, and means responsive to movement of said member in either direction for disabling said winch and thereby preventing both excessive and insufficient tension in said tension element.

8. In an overhead fixture system, the combination comprising an elongated raceway adapted to be supported in overhead position, a plurality of horizontally elongated fixtures spaced along said raceway, each of said fixtures having a pair of spaced upwardly projecting guide plugs, said raceway having respective downwardly opening guide sleeves for receiving said plugs, fixture pulleys mounted in close proximity to said respective guide plugs, a plurality of overhead pulleys mounted on said raceway on either side of said guide sleeves, and a flexible tension element extending over said overhead pulleys and looped under said fixture pulleys to provide suspension loops for raising and lowering said fixtures.

9. In an overhead fixture system, the combination comprising an elongated supporting member adapted to be mounted in an overhead position, a plurality of lighting fixtures spaced along said supporting member, a plurality of generally tubular vertically oriented guide members mounted on said overhead supporting member adjacent said fixtures, respective guide elements on said fixtures for telescopic engagement with said guide members, and means supported on said supporting member for raising and lowering said fixtures to and from an overhead position adjacent said supporting member, said guide members and elements being adapted to locate said fixtures in predetermined positions relative to said supporting member.

10. In a fixture system, the combination comprising a fixture, overhead supporting means for supporting said fixture, a guide plug extending upwardly from said fixture, a guide sleeve on said overhead supporting means for telescopically receiving said guide plug, said guide plug comprising first and second pairs of generally vertical channels secured together back-to-back, said first channel having an outwardly projecting generally horizontal flange, an L-shaped latch hooked over said flange and having an upwardly extending leg positioned in said first channel and provided with a downwardly facing shoulder, said sleeve having inwardly projecting latch abutment means for engaging said shoulder, means for biasing said latch into engagement with said abutment means, means for releasing said latch, and means carried by said overhead supporting means for raising and lowering said fixture to engage and disengage said plug from said sleeve.

11. In a fixture system, the combination comprising a plurality of generally horizontally mounted elongated fixtures, each of said fixtures having a pair of longitudinally-spaced fixture pulleys, a plurality of spaced-pairs of overhead supported pulleys disposed above said fixture pulleys, a pair of suspension cables, each of said cables passing by alternate spaced pairs of support-pulleys and thereby being looped under fixture pulleys only at the same corresponding end of each of said fixtures, means for dispensing-out footage or for taking-up footage in each cable of said suspension cable pairs to permit the lowering of a first one of said fixtures to within manual reach from the floor, means to permit the manual lowering of a second one of said fixtures without the need of additional cable dispensing from said cable dispensing means whereby said fixture is re-elevated, and a manual means for leveling of said first-fixture as it approaches the re-elevated position, said manual leveling means being operated by manually manipulating said lowered second-fixture.

12. In an overhead supported fixture system, the combination comprising a plurality of generally horizontally mounted elongated fixtures, each of said fixtures having a pair of longitudinally-spaced fixture pulleys, a plurality of spaced-pairs of overhead-supported pulleys disposed above said fixture pulleys, a pair of suspension cables, each of said cables passing by alternate spaced pairs of support-pulleys and thereby being looped under fixture pulleys only at the same corresponding end of each of said fixtures, means for dispensing-out footage or taking-up footage in both of said cables to permit the lowering of a first one of said fixtures to within manual reach from the floor, means to permit the manual-lowering of a second one of said fixtures whereby said first fixture is re-elevated, and means for reversing the operation of said cable dispensing means for causing it to take-up said cable footage and thereby cause the manually-lowered second fixture to be re-elevated upward to its normal elevated position.

13. In an overhead lighting fixture system comprising a plurality of individual fixtures, overhead supporting means, a pair of flexible-tension elements engaging said supporting means and defining a plurality of vertically adjustable horizontally spaced loop-pairs, respective guide means on said fixtures and carried by said loop-pairs for supporting said fixtures thereon, means for paying an additional footage of said tension element-pair and thereby permitting one fixture of said plurality of individual fixtures to be lowered, manual means for lowering a second-one of said fixtures thereby causing said first-lowered fixture to be re-elevated and manual means operating thru the said tension elements to permit the leveling of said first-lowered fixture as it is re-elevated by manually changing the angle of said second-lowered fixture by an operator standing on the floor.

14. In an overhead fixture system, the combination comprising a plurality of horizontally spaced guides in overhead positions, a tension element supported on said guides and adapted to be pulled downwardly to form vertically adjustable loops, a plurality of vertically adjustable fixtures for engaging said loops and adapted to be suspended on said loops, an electric power-operated winch releasably mounted at the elevated fixture level for reeling said tension element in and out and thereby raising and lowering said fixtures, and means responsive to tension in said tension element for disabling said winch to prevent either excessive or insufficient tension in said tension element, a first power control switch for manually actuating said winch so as to lower a first-one of said fixtures, manual means for lowering a second one of said fixtures and thereby re-elevating said first one, and a second power control switch for actuating said winch to re-elevate said second lowered fixture.

15. In an overhead supported fixture system having a plurality of fixtures, means carried on each of said fixtures for disengagably locking each of said fixtures in an elevated position, a flexible tension element having a plurality of downwardly extending adjustable loops each one of which supports adjustably one of said fixtures, a power-supplied operating means mounted overhead for lengthening or shortening any one of said loops when one of said fixture locking means is disengaged, means controlled by the tension on said tension element for discontinuing the power to said power-supplied operating means, and thereby preventing excessive or insufficient tension from being applied to said tension element by excessive operation of the power-supplied operating means.

16. The combination of claim 15 wherein said power supplied means is provided with a counterbalanced manual means for manually lowering said power-supplied means from its overhead position and which comprises using one of said fixtures together with said tension element as components of said counterbalancing means.

17. In an overhead fixture system, the combination comprising a plurality of horizontally spaced guides in overhead positions, a tension element supported on said guides and adapted to be pulled downwardly to form vertically adjustable loops, a plurality of vertically adjustable fixtures for engaging said intermediate portions and adapted to be suspended on said loops, a power-operated winch releasably mounted at the elevated fixture level for reeling said tension element in and out for raising and lowering any one of said fixtures, and means responsive to tension in said tension element for disabling said winch in the event of either excessive or insufficient tension in said tension element and thereby preventing either breakage or undue slack in said tension element and further means for using one of said vertically adjustable fixtures as a counterbalance for manually lowering said winch from its said releasably mounted elevated level, and means for disconnecting said power supply when said winch is manually lowered.

18. The combination of claim 17 wherein said winch is actuated by a first power control switch to lower a first one of said fixtures, manual means for lowering a second one of said fixtures thereby re-elevating said first one, and a second power control switch for actuating said winch to re-elevate said second lowered fixture.

19. In an overhead lighting fixture system comprising a plurality of individual fixtures, overhead supporting means, a pair of flexible-tension elements engaging said supporting means and defining a plurality of vertically adjustable horizontally spaced loop-pairs, respective guide means on said fixtures and carried by said loop-pairs for supporting said fixtures thereon, a winch means for paying an additional footage of said tension element-pair and thereby permitting one fixture of said plurality of individual fixtures to be lowered, means for releasably holding said winch means in the overhead position, and manually operated counterbalanced means which comprises using one of said fixtures as the counterbalance for manually lowering said winch on said tension element-pair.

20. In an overhead fixture system, the combination comprising a plurality of overhead guides, a pair of elongated flexible tension elements supported on said guides and adapted to form downwardly extending loops in alternate elements of said pairs of tension elements, a plurality of fixtures having rolling engagement with said loops and adapted to be suspended on said loops, means for releasably holding said fixtures in overhead positions adjacent said guides, and an electrically-operable means for simultaneously reeling said pair of tension elements in or out for raising or lowering any one of said fixtures, secondary means for suspending said winch on said flexible tension element, primary means for releasably holding said winch in overhead position, separable and disconnecting electrical contacts for supplying electrical power to said winch when holding in the said overhead position, and manual means for lowering said overhead winch which comprises the use of a previously lowered said fixture to counterbalance said overhead winch when it is suspendably-lowered manually on said pair of flexible tension elements.

21. The combination of claim 20 wherein said winch is made inoperative during said suspendably-lowered manual operation.

References Cited in the file of this patent

UNITED STATES PATENTS

| | | |
|---|---|---|
| 2,391,936 | Wilson | Jan. 1, 1946 |
| 2,609,170 | Farrington | Sept. 2, 1952 |

FOREIGN PATENTS

| | | |
|---|---|---|
| 981,139 | France | Jan. 10, 1951 |